(No Model.)
C. K. BRADFORD.
FISHING REEL.
No. 384,742. Patented June 19, 1888.
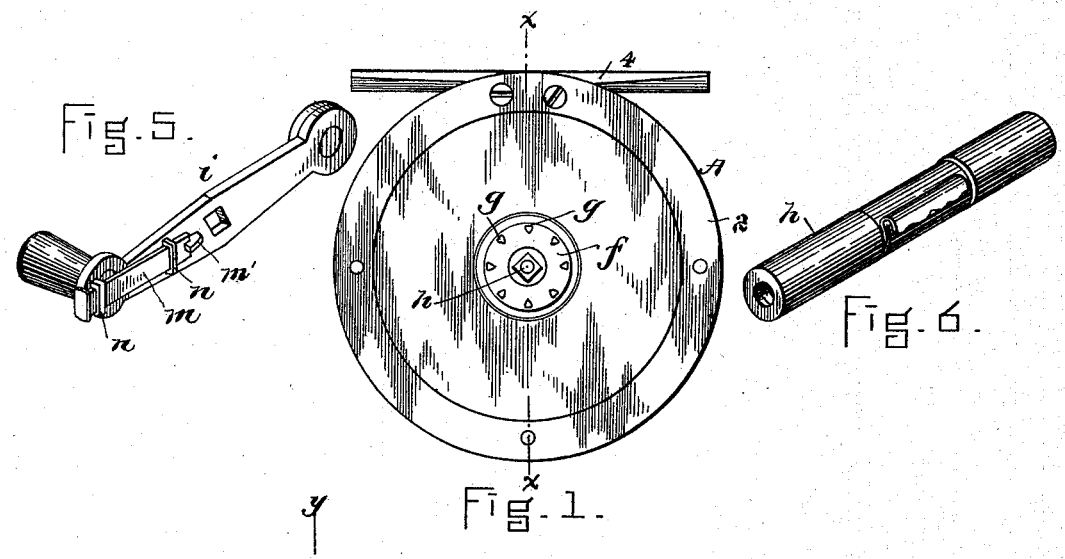
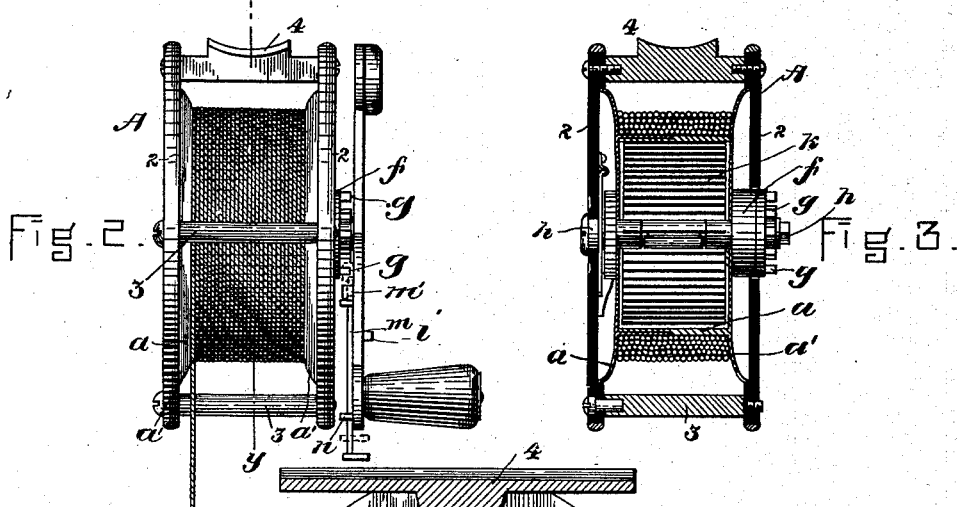
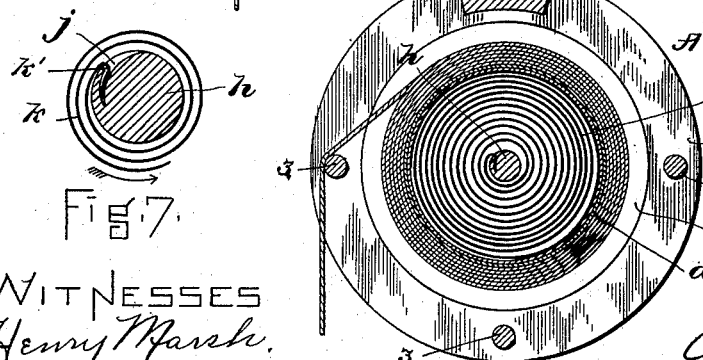
Witnesses
Henry Marsh.
A. D. Harman.
Inventor.
C. K. Bradford.

UNITED STATES PATENT OFFICE.

CHARLES K. BRADFORD, OF LYNNFIELD, ASSIGNOR TO WILLIAM F. KAKAS, OF BOSTON, MASSACHUSETTS.

FISHING-REEL.

SPECIFICATION forming part of Letters Patent No. 384,742, dated June 19, 1888.

Application filed April 30, 1888. Serial No. 272,283. (No model.)

*To all whom it may concern:*

Be it known that I, CHARLES K. BRADFORD, of Lynnfield, in the county of Essex and State of Massachusetts, have invented certain new and useful Improvements in Reels for Fishing-Rods, of which the following is a specification.

My invention has for its object the provision of such improvements in fishing-reels as will enable the angler, when the fish takes the bait, to keep him under a continuous and regular pull, whether he runs "out" or off with the bait, or "in," in order to quickly exhaust him and bring his violent struggles to an end, so that he may be brought to land or to the landing-net.

My invention consists, broadly, in a fishing-reel having a barrel upon which the line is adapted to be wound, a rotary journal-shaft upon which the barrel is adapted to revolve, and a spring surrounding said shaft, and having its ends operatively connected, respectively, to the barrel and shaft, so that when the shaft is prevented from rotating and the spring is under suitable tension the spring will impart a continuous rotative yielding stress to the barrel, and thus maintain a regular or even pull or strain on the line, whether it is run out or in.

My invention also consists, in addition to the foregoing, of a crank for rotating the journal-shaft and means whereby it may be connected with or disconnected from the barrel or hub of the barrel, in order that said barrel may be positively rotated unaffected by the spring, or be allowed to revolve on the shaft retarded or influenced by the spring.

My invention also consists in certain details whereby injury to the spring by overwinding or by backwardly rotating the shaft is prevented.

My invention will first be described in view of the accompanying drawings, forming a part of this specification, and then be pointed out in the appended claims.

Of the drawings, Figure 1 is an end view of my improved reel, the crank for rotating the shaft being removed. Fig. 2 is a side view of the same, the crank being shown in position on the shaft. Fig. 3 is a section on the line $xx$ of Fig. 1. Fig. 4 is a section on the line $yy$ of Fig. 2. Fig. 5 is a perspective view of the crank and its adjuncts. Fig. 6 is a perspective view of the journal-shaft. Fig. 7 represents an enlarged transverse section of the shaft and a portion of the spring.

The same letters of reference indicate the same parts in all of the figures.

In the drawings, A designates a reel-frame of usual construction, consisting of two end plates, 2 2, the intermediate space or stay-rods, 3, and the base-plate 4, for attaching the reel to a fishing-rod. The barrel $a$ is herein shown as composed of two cylindrical parts, the one fitting upon or telescoping the other, like the lid of a blacking-box upon the body of the box. Any other suitable form or structure that will constitute a hollow body for the barrel will, however, answer as well. Each part of the barrel is provided with a flange, $a'$, of usual form. One end of the barrel is provided with an enlarged hub, $f$, which extends beyond the flange at that end of the barrel, and is provided with pins $g$, as shown.

$h$ designates a shaft extending through the barrel and its hub $f$ and the end plates of the reel-frame, and adapted to rotate loosely or independently in said hub. The end of the shaft adjacent to the enlarged hub of the barrel is squared or otherwise fitted to receive a crank, $i$, whereby the shaft may be rotated. The shaft $h$ is provided at a point within the barrel with a notch or pocket, $j$, which is formed to receive the reversely-bent or hook-shaped inner end, $k'$, of a spring, $k$. Said spring is coiled about the shaft and frictionally connected at its outer end with the barrel, either by simply bearing thereagainst or by being connected with a piece or shoe arranged to bear on the barrel and exert a drag thereon as it is revolved on the shaft.

$m$ designates a slide adapted to be moved longitudinally in and be supported by bearings $n$, secured to the crank, and so constructed or formed at its inner end as to adapt it to pass between the pins $g$ of the enlarged hub $f$, said inner end constituting a latch or bolt, $m'$, which, when projected between the pins $g$, as shown in dotted lines in Fig. 2, locks the crank to the hub of the barrel, and when withdrawn, as shown in full lines in Fig. 2, releases the crank from the hub and barrel, so that the barrel and its hub can be rotated independently on the shaft. When the crank and shaft are engaged with the hub of the barrel by the latch $m'$, the reel is operated like an ordinary reel and the spring $k$ has no function, the reel being simply rotated in either direction by the crank to wind or unwind the line. When, on the other hand, the bolt or latch $m'$ is withdrawn from the pins $g$, and the barrel and its hub are thereby disengaged from the shaft $h$, the angler, by holding the crank $i$ to prevent the shaft from rotating, makes the spring operative and causes it to exert a yielding rotative stress on the barrel, so that when a fish has taken the hook and is pulling on the line the barrel will be rotated by the pull of the fish against the stress of the spring. When the fish moves inwardly the spring rotates the reel in the direction required to draw in the line, so that an inward though constantly-yielding pull is always automatically exerted on the line without the rotation of the crank, the fisherman having only to hold the crank from rotating, excepting when it is necessary or desirable to increase the tension of the spring, which may be done at any time by rotating the crank in the direction required to wind up the spring, the barrel being at the same time prevented from rotating freely by the pull exerted on the line by the fish or by the operator holding the line. When the spring is fully wound, its frictional bearing on the barrel permits it to slip on the inner surface of the barrel, so that no injury is caused by overwinding.

The described engagement of the inner end of the spring with the shaft by the interlocking of the hook $k'$ of the spring with the slot or pocket $j$ in the shaft permits the automatic disengagement of the spring from the shaft in case the shaft is rotated backwardly, as indicated by the arrow in Fig. 7, the pocket $j$ and hook $k'$ being so formed that by a backward rotation of the shaft the pocket will leave the hook and the shaft will rotate alone; but when the shaft is rotated in the opposite direction the pocket will receive and operatively engage the hook. Provision is thus made against the possibility of damage by backward rotation of the shaft.

It will be seen that by making the barrel and its operating-shaft independently rotatable, and providing a spring connecting the barrel and shaft and means for disengaging the shaft from the barrel, the necessity of constant rotation of the barrel by the angler while a fish is on the line is obviated, the spring acting automatically and permitting the fish to play in either direction, letting out the line as the fish recedes and taking it in as the fish moves inward, and at all times exerting a yielding inward pull, which is calculated to speedily weary and subdue the fish. If the inward pull of the spring becomes insufficient by the continued inward movement of the fish, the fisherman can increase said pull by rotating the shaft to wind the spring, as already stated.

I claim—

1. In a reel for fishing-rods, the combination of a supporting-frame, a shaft journaled in said frame, a drum or barrel mounted to rotate loosely on said shaft, a coiled spring engaged at its inner end with the shaft and at its outer end with the barrel, a crank or handle affixed to the shaft, whereby the operator may hold the shaft and the end of the spring engaged therewith, and thereby enable the spring to rotate the barrel independently of the crank, and a movable locking device, whereby the crank or handle may be locked to the barrel, to enable the latter to be rotated by the crank instead of by the spring, as set forth.

2. The combination of a supporting-frame, a shaft, $h$, journaled therein and provided with a slot or pocket, $j$, a barrel or drum mounted to rotate loosely on the shaft, and a spring having a hook at its inner end detachably engaged with the pocket of the shaft, and having its outer end operatively engaged with the barrel, the described engagement of the inner end of the spring with the shaft enabling the spring to be disconnected from the shaft by a backward rotation of the latter, as set forth.

3. The combination of a supporting-frame, a shaft, $h$, journaled therein, a barrel or drum mounted to rotate loosely on the shaft, and a spring having its inner end engaged with said shaft and its outer portion in frictional contact with the inner surface of the barrel, whereby the spring may slip on the barrel when fully wound, as set forth.

4. The combination of the supporting-frame, a shaft journaled therein and provided with a crank or handle, a barrel or drum mounted to rotate loosely on the shaft and provided with a hub having pins or projections $g$, the spring operatively engaged with the barrel and shaft, and a bolt adapted to slide on the handle of the shaft into or out of engagement with the projections $g$ of the barrel, as set forth.

In testimony whereof I have signed my name to this specification, in the presence of two subscribing witnesses, this 26th day of April, A. D. 1888.

CHAS. K. BRADFORD.

Witnesses:
C. F. BROWN,
A. D. HARRISON.